UNITED STATES PATENT OFFICE.

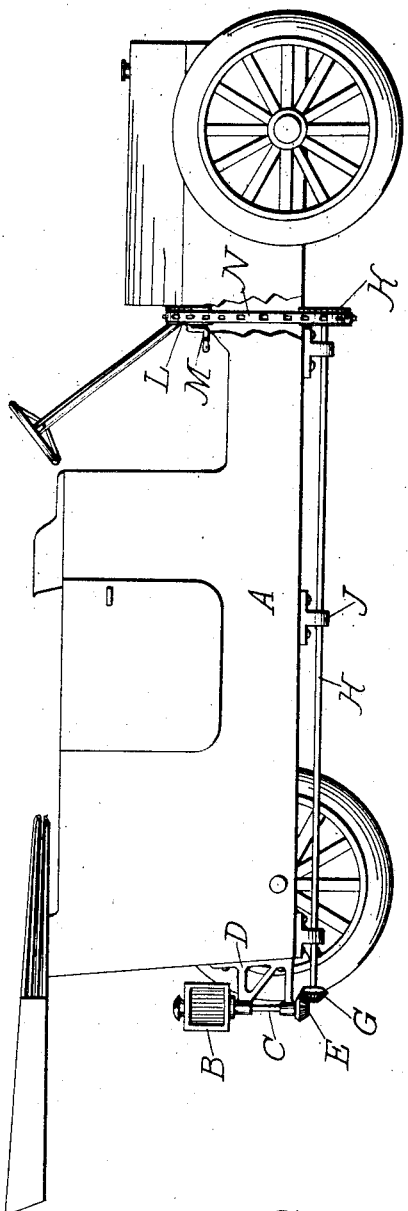

GEORGE F. MINHINNETT, OF BLOOMING GROVE, TEXAS.

REVERSIBLE AUTOMOBILE-LAMP.

1,037,961. Specification of Letters Patent. Patented Sept. 10, 1912.

Application filed March 21, 1911. Serial No. 615,955.

*To all whom it may concern:*

Be it known that I, GEORGE F. MINHINNETT, a citizen of the United States, residing at Blooming Grove, in the county of Navarro and State of Texas, have invented certain new and useful Improvements in Reversible Automobile-Lamps, of which the following is a specification.

My invention relates to new and useful improvements in reversible automobile lamps. Its object is to provide a tail-light for automobiles, adapted to be rotated about a vertical axis by means of a mechanism operated from the seat of the car, thus making it possible in the case of a square lamp to display four different colored signal lights. Thus for example; a red light may serve to indicate that the car is standing still, and a green light that it is in motion, and the other lights may have some other suitable significance.

A further object of the invention is to provide a device of the character described that will be simple and efficient, and comparatively inexpensive, and one that will not detract from the appearance of an automobile.

With these objects in view, my invention has relation to certain novel features of the construction and operation, an example of which is described in the following specification, and illustrated in the accompanying drawing. In this drawing there is shown a side elevation of an automobile equipped with the herein described reversible lamp, the rear wheel on the near side being removed, and a portion of the body being broken away to reveal the mechanism of the invention more clearly.

Referring now to the letters, which are employed in the drawing to designate the various parts of the invention, the letter A denotes an automobile of any common make or design, which is provided with a four-sided tail-lamp B. The lamp is centrally mounted upon a vertical shank or spindle C, rotatable in a bracket D attached to the rear end of the automobile. A beveled pinion E is carried by the lower extremity of the rod C, and is engaged by a similar pinion G fast upon the rear end of a shaft H, mounted longitudinally beneath the car in bearings J. A sprocket wheel K is mounted upon the forward extremity of the shaft H, and another sprocket wheel L is mounted vertically thereabove upon a rotatable crank denoted by M. The crank M, is within easy reach of the chauffeur, and may be manually rotated. Rotation will be communicated from the sprocket wheel L to the sprocket wheel K through a chain N.

The above described device will prove very useful especially in large cities where there is considerable traffic, making it possible for an automobile driver, at night to see at a glance whether another machine is in motion or standing still.

Other mechanisms than that shown may be employed to produce rotation of the tail-lamp, or to communicate rotation to the shaft H, longitudinally mounted beneath the vehicle. The invention is, therefore, presented as covering all changes and modifications, which are included in the following claim.

What I claim is:

In a device of the character described, the combination with an automobile, of a four sided tail-light, a vertical spindle upon which the tail light is centrally mounted, a bracket attached to the rear end of the vehicle body and rotatably supporting said spindle, a shaft rotatably mounted longitudinally beneath the body, a bevel gear on the lower extremity of the spindle meshing with a bevel gear on the rear extremity of said shaft, a sprocket wheel carried by the forward extremity of said shaft, a second sprocket wheel rotatably mounted above the first and adjacent to the seat of the vehicle, a crank adapted to impart rotation to the last named sprocket wheel, and a driving chain communicating rotation from the second to the first named sprocket wheel.

In testimony whereof I have signed my name to this specification in the presence of two subscribing witnesses.

GEORGE F. MINHINNETT.

Witnesses:
G. H. CHAMBERS,
ARTHUR McGINTY.